July 28, 1942.  M. SCHWARTZ ET AL  2,291,190
SYNCHRONIZING DEVICE FOR CAMERAS
Filed Aug. 7, 1939  3 Sheets-Sheet 3
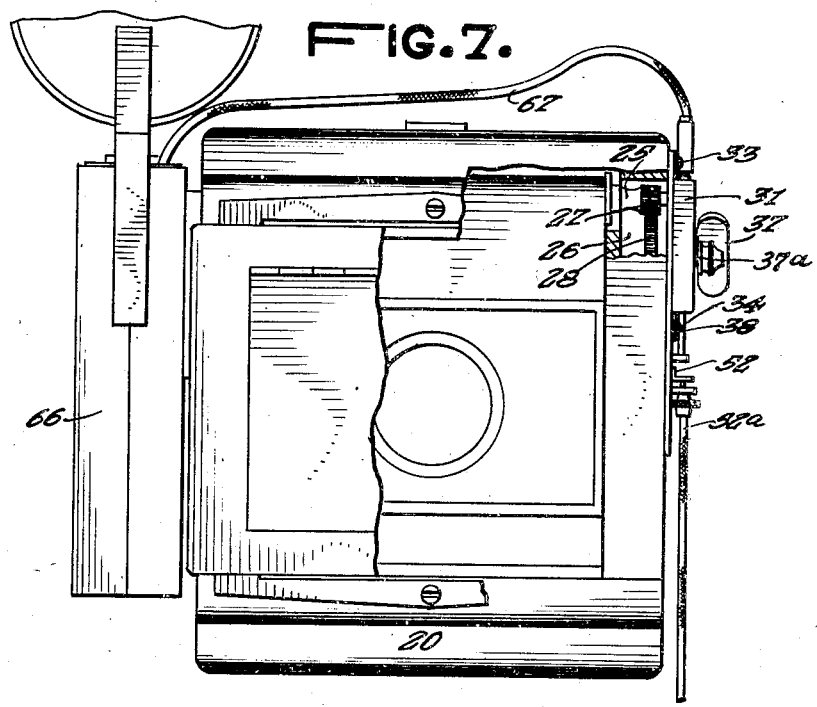
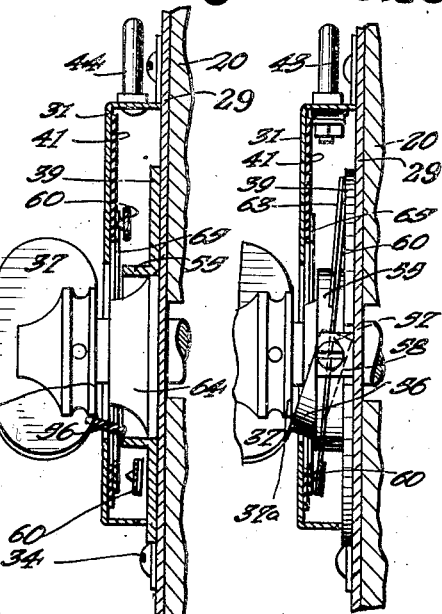
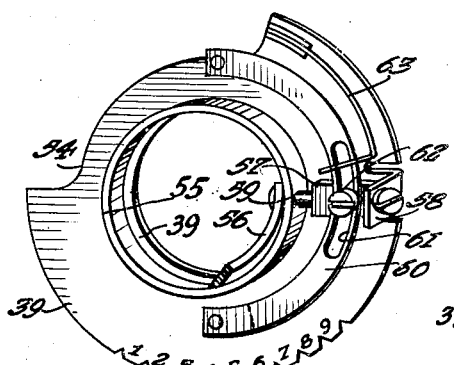
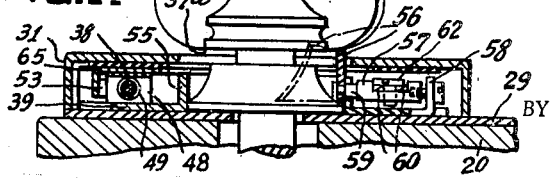
INVENTORS
MORRIS SCHWARTZ
ERNEST SISTO
WILLIAM CASTEDELLO
BY Louis Cooper
ATTORNEY Patented July 28, 1942

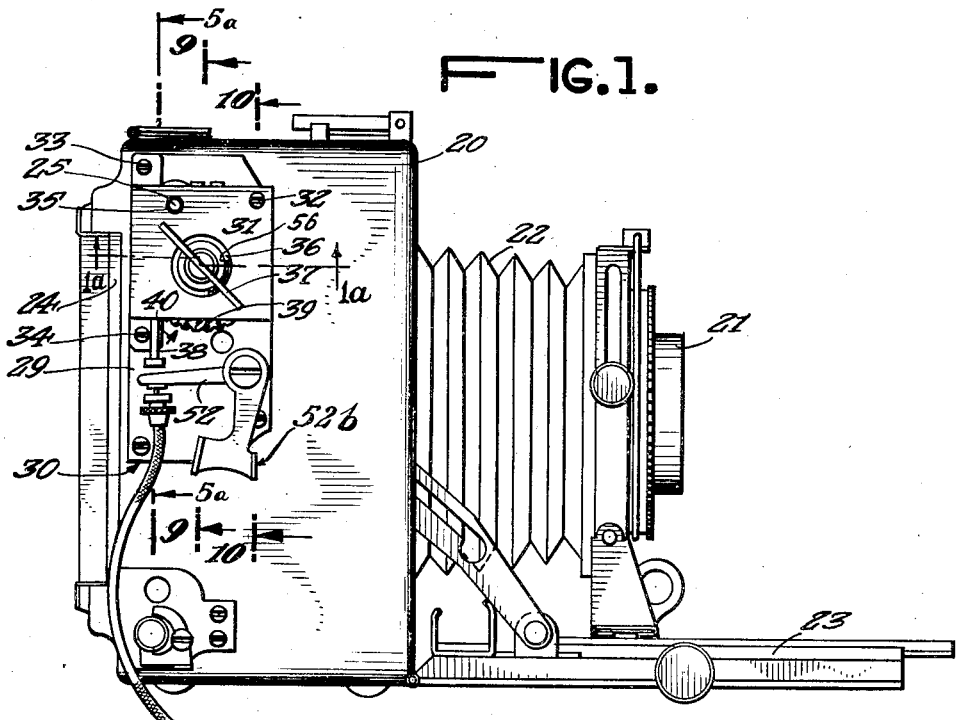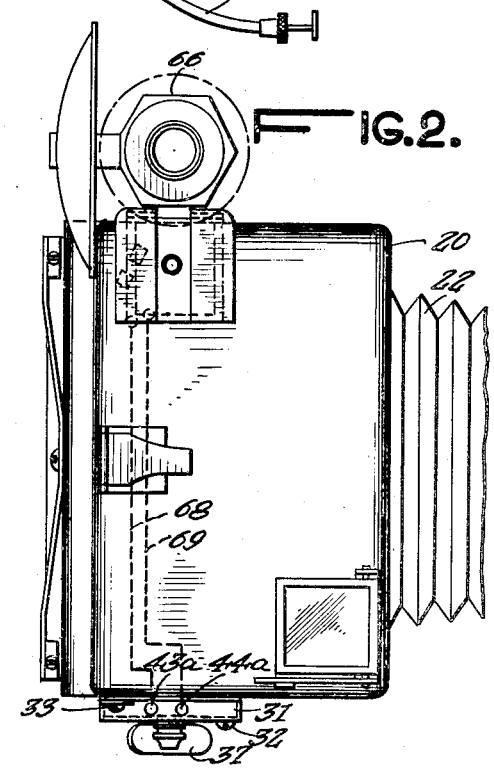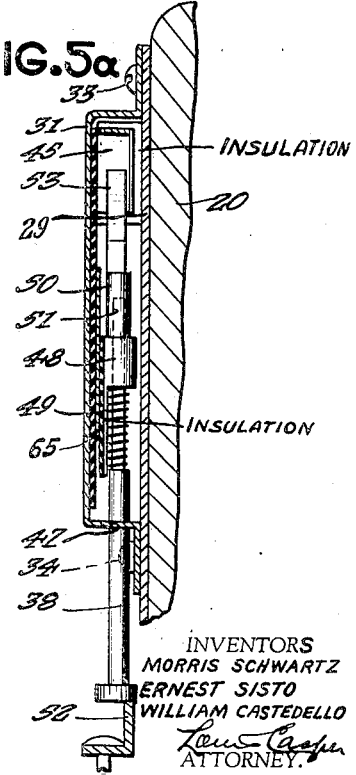

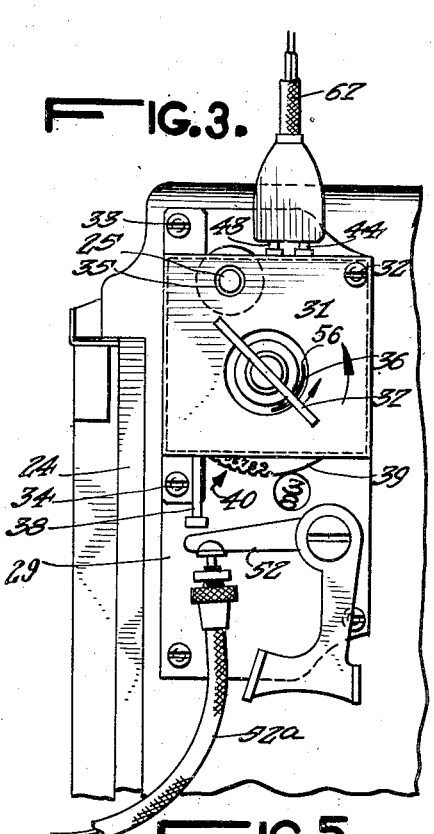
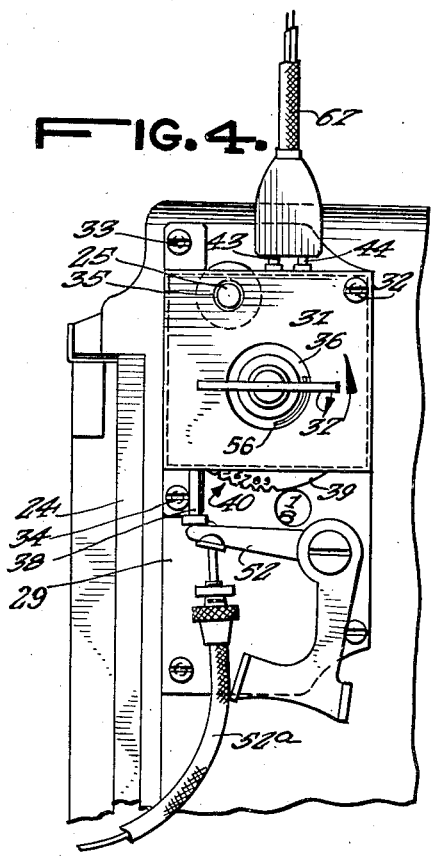
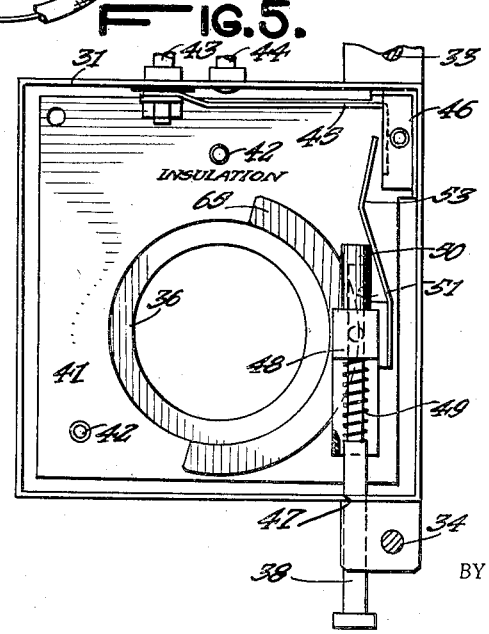
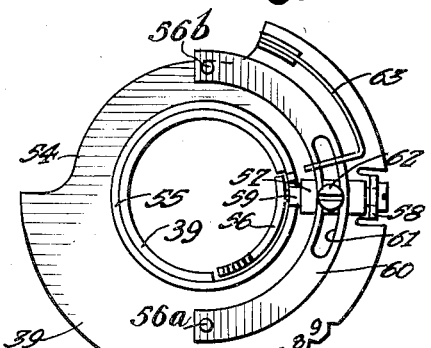

2,291,190

UNITED STATES PATENT OFFICE 2,291,190

SYNCHRONIZING DEVICE FOR CAMERAS

Morris Schwartz, New York, Ernest Sisto, East Elmhurst, and William Castedello, Huntington, N. Y., assignors, by direct and mesne assignments, to The Kalart Company, Inc., Stamford, Conn.

Application August 7, 1939, Serial No. 288,782

10 Claims. (Cl. 67—29)

This invention refers to timing devices applicable for cameras having focal plane shutters. Our invention bears a relation to Patent No. 1,959,596, granted to Philip De L. Patterson, May 22, 1934.

An object of this invention is to provide a timing synchronizer arrangement for a camera shutter, said arrangement constructed in a manner easily attachable to a camera and not requiring any particular change in the camera mechanism or structure.

A further object of this invention is to provide a timing mechanism for a camera which will provide means for regulating the timing interval between the opening of the screen shutter and the flashing of a flashlight bulb.

A further object of the invention is to provide a synchronizer for cameras having focal plane screen shutters and means contained in said synchronizer to regulate the timing thereof and for instantaneous synchronization of the shutter and the flashlight bulb.

A further object is to provide a novel internal electric wiring arrangement between the synchronizer proper and the battery case that is used in connection with the operation of the flashlight.

In further description of our invention reference is had to the figures in which:

Fig. 1 illustrates a camera having a focal plane screen shutter and showing the manner in which the synchronizer is attached to the camera body.

Fig. 1a is a section taken on a line 1a—1a of Fig. 1.

Fig. 2 is a plan view of a camera shown in Fig. 1, showing an internal wiring arrangement for use in connection with a flashlight circuit.

Fig. 3 is an enlarged view showing the synchronizer cocked and in position preparatory for operation.

Fig. 4 shows the synchronizer in the position of just starting in its progressive operative movement.

Fig. 5 is a view of the inside of the cover of the synchronizer unit, showing the electric contacting arrangement and the safety switch.

Fig. 5a is a section taken from the line 5a—5a in Fig. 1, showing the safety switch in further detail.

Fig. 6 is a detailed view of the apertured disk that is used for regulating the timing of the synchronizer unit.

Fig. 7 is a rear view of a screen shutter camera showing the manner in which the synchronizer is attached to the camera; also showing a modification of the flashlight wiring arrangement to that shown in Fig. 2, said modification illustrating the manner of external wiring between the synchronizer and the battery case.

Fig. 8 is a perspective view of the apertured disk shown in Fig. 6.

Fig. 9 is a section through the synchronizer unit taken on the line 9—9 of Fig. 1.

Fig. 10 is a section of the synchronizer taken on the line 10—10 of Fig. 1.

Referring to Fig. 1, the numeral 20 is a camera having a lens 21, bellows 22, camera bed 23 and plate holder 24. A shaft 25, which operates the screen shutter 26 is located at the upper part of the camera 20. The shaft 25 has a gear 27 which is operated through the medium of a gear 28 in the usual manner of a camera of the type shown in the drawings.

A curtain shutter plate 29 is located at the side 30 of the camera 20. The camera 20 is equipped with the standard type plane shutter in the form of a curtain, said curtain having several successive openings of different widths. Said curtain is wound upon rollers inside the camera by means of the winding handle 37 and when wound up is held in wound position by a locking lever arrangement (not shown). Said locking lever arrangement is in operable connection with a finger lift 52 and the forward movement thereof releases said locking lever arrangement and the consequent unwinding set-off of the shutter curtain.

The arrangement as described is common to such types of cameras known as Graphic Cameras. Our invention is attached to said camera, and is further applicable to cameras of the kind having a focal curtain shutter strip.

The rectangular synchronizer cover 31 is secured over the plate 29 by means of screws 32, 33 and 34.

The cover 31 has a boss cavity 35 into which the end of the shaft 25 rests.

The cover 31 also has an opening 36 over which is placed the shutter operating knob or handle 37.

A rod 38 extends through the bottom of the cover 31. The apertured disk 39 projects partially below the synchronizer cover 31. The apertured disk 39 has numerals marked thereon from 1 to 9, which serve as a setting guide for adjusting the position of said disk. In Fig. 3 the arrow 40 shows the position in which the disk is set.

Referring to Fig. 5, which illustrates an inside view of the synchronizer cover 31, the insulation 41, is secured to the cover 31 through the medium of rivets 42. A pair of prongs 43 and 44, is secured at the upper part of the cover 31.

The prong 43 is insulated from the cover 31 and is electrically connected through the medium of insulated wire 45 to contact block 46, said block being insulated from the cover 31 by means of the insulation 41.

The rod 38 enters the cover 31 through an opening 47. A block 48 serves to support the rod 38. A spiral spring 49, which encircles said rod, serves to maintain said rod under downward tension.

An insulated head portion 50 is secured on the rod 38 at 51.

When the rod 38 is moved upward against the pressure of the spiral spring 49 through the medium of the movement of the finger lift 52, the insulated head portion 50 will depress the flat spring 53 against the contact block 46, thus making an electrical contact.

The spring 53 is in electrical connection with the semi-circular contact strip 65, said strip being insulated from the cover 31. The apertured disk 39 has a cut out portion 54 and a flanged collar 55. A pivotally mounted member 56 is hinged at the pivot 57 which hinges in a bearing 58 of the apertured disk and the bearing 59 of the flange 55.

A half round spring contact arm 60 is also secured to the pivot 57. The contact arm 60 has an adjusting slot 61, and is secured to pivot 57 by means of a screw 62. By means of said adjustment slot the contacting position of the contacting portions 56a and 56b may be varied on the initial assembly of the arrangement as shown in Fig. 8.

A spring 63 serves to keep the contact arm 60 in raised position at the lower end thereof as shown in Fig. 10.

The apertured disk 39 is placed over the circular extension 64 of the plate 29 (see Fig. 9). Said disk can be rotated by the operator of the camera when it is required to adjust the timing of the synchronizer of the camera 20. The semicircular contact strip 65 upon which the contact spring 53 rests is located inside the cover 31 and is secured in position as shown in Fig. 5 as stated.

A battery case 66 is fastened to the camera 20 and a flexible cord 67 connects the battery in said battery case 66 to the prongs 43 and 44 shown in Figs. 9 and 10.

Referring to Fig. 2, which illustrates an internal wiring arrangement between the synchronizer and the battery case: In this instance, instead of connecting the battery with the synchronizer by means of a flexible cord 67 as shown in Fig. 7 and with prongs similar to prongs 43 and 44 in Fig. 3, there is enclosed inside the camera body wire leads 68 and 69 from the synchronizer terminals 43a and 44a Fig. 2 to the battery within the battery case 66.

Operation

To operate the focal plane screen shutter 26 of the camera 20, the knob 37 of which the shutter mechanism is a part is turned 180° (see Fig. 4). Since the screen shutter is always under spring tension, when the knob or handle 37 is released through the usual mechanism well known to the art, said knob will return when released to its original position as shown in Fig. 1. The movement of the knob as described above, is utilized in the applicants' invention not only to operate the shutter but also to operate simultaneously the flashlight synchronizer in the following manner:

The cam member 56, shown in Fig. 6, which hinges on the pivot 57, is normally held in position shown through the medium of the tension of the spring 63, in a manner to move in the flanged collar 55 of the apertured disk 39, to the position as shown in Figs. 9 and 10. The cam member 56 contacts with the bottom portion 37a of the knob 37. When the knob 37 is in the position as shown by the arrow in Fig. 3, the lower part 37a rides over the pivoted cam member 56. The free end of the cam member has an angular conformation, said conformation sliding over contiguous contact surface 37a of the knob 37.

When the knob 37 is released and returned, it depresses the member 56. This movement will turn the pivot 57, causing the half round contact arm 60 to connect with the semi-circular contact plate 65.

The release of the knob 37 occurs when the finger lift lever 52 is raised by depressing the cable release 52a or by index finger at 52b, said knob 37 being in operative engagement with the lift lever 52, the aforesaid arrangement being standard with the type of camera illustrated herein. The rod 38 at the moment the lift lever 52 is lifted is also raised, and the beginning of the latter movement closes the gap between the spring 53 and the contact block 46, before knob 37 has started to move.

The utilization of the switch comprising the spring 53 and the contact block 46 affords a safety factor in the possibility of a short-circuit in any portion of the synchronizer circuit beyond the spring 53 and the contact block 46, the latter switch arrangement being termed a "safety switch."

The electric circuit in the synchronizer arrangement as described includes the spring 53, contact block 46, insulated wire 45, prong 43, insulated wire 67, battery in the case 66, prong 44, synchronizer cover 31, disk 39, contact arm 60, and contact strip 65. As the winglike knob or handle 37 turns half a revolution, it releases arm 56 which permits the contact point portion 56a or the contact portion 56b of the arm 60 to make contact with the strip 65, thus completing the circuit that fires the flashbulb. When the knob 37 completes its half revolution, it depresses the arm 56 which in turn again opens the circuit at either contact portions 56a or 56b of the arm 60 and the strip 65.

When it is required to change the timing interval of contacting of the spring contact arm 60 with the contact strip 65, the apertured disk 39 is set in a direction beyond the arrow 40 shown in Fig. 3.

The selection of whichever contact portions 56a or 56b contacting upon the plate 65 depends upon the position of the apertured disk 39 with respect to the handle 37; said position of the disk 39 is changed at the will of the camera operator by revolubly shifting said disk, said shifting thereof being made possible by the projection of a portion of said disk below the cover 31 as heretofore stated.

The aforesaid operation will change the time relation of operation between the knob 37 and the pivoted member 56 with the consequent changing of the time period of contact between the spring contact arm 60 and the contact strip 65. The aforesaid action will cause a change in the timing interval between the flashing of the flashlight and the operation of the screen shutter.

When it is desired to make a time exposure, the shutter is set at T (not shown in the figures), said setting being common to cameras of the type shown in the drawings. The disk 39 is then moved with the finger to the position in which the numeral "1" on said disk will be in line with the point of the arrow 40 shown in Fig. 3.

When said setting occurs, the end portion of the cam member 56 is in a raised position, contact is made by the contact arm 60 at 56b with the strip 65 and the opposite portion 56a is raised clear of said strip 65.

When knob 37 is turned 145°, said turning results in a full opening of the camera screen shutter which is the usual adjustment of cameras of this type. The pivoted cam member 56 will be pressed by means of the portion 37a of the knob 37; and, at the same time the contact portion 56b will be raised upward against the contact strip 65 resulting in the closing of the electric circuit already described, and the flashing of the flashlight attached to the battery case 66.

It will thus be seen by means of our invention a very compact and efficient arrangement is provided readily attachable to especially types of camera known in the art as the Speed Graphic type. Said type of camera is provided with a focal plane shutter curtain. Said curtain is provided with slits or openings. Shafting means are operably attached to said curtain, said shafting arrangement operates and regulates the speed at which a selected opening in said shutter curtain will move by the focal plane. The camera is provided with lever releasing means controlling the rotatable movement of the shafting means connected to said shutter curtain. The releasing means operates in conjunction with the winding handle 36 which is attached to and rotatable with said shafting arrangement.

The foregoing description is well known to the art and is given here to amplify the type of camera to which this invention especially applies. Said arrangement provides a photo-flash means operating synchronously with the operation of the combination winding and curtain shutter set off handle of said camera. The aforesaid arrangement is attachable to said camera without the defacing or mutilation thereof.

It is understood that the particular device described above is intended to be merely illustrative and not limitative of the invention, since it is obvious that the invention may be effected by apparatus arranged in various other ways within the scope of the claims.

What we claim is:

1. In combination, a camera having a multiple aperture focal plane shutter curtain, unwinding and winding up rollers supporting said shutter curtain, a winding handle and a shaft associated with said rollers whereby said shutter curtain may be wound up or cocked, a release lever normally operative to maintain said shaft and winding handle in cocked position, means including said winding handle for controlling a photoflash unit associatable with said camera, said unit including an apertured disk contiguous to said winding handle and having a flanged aperture through which said winding handle projects, a cam member pivotally mounted in the flange of said disk, a projecting portion on said handle in the path of and engageable with said cam, a movable contact member controlled by said cam, an associated contact strip in said unit and means operative on the release of said handle by said release lever and including said projecting portion on said handle for moving said movable contact member into engagement with said contact strip, said contact strip and said movable contact being included in a circuit having a flashlight and a battery therein.

2. The structure as set forth in claim 1, and including a normally open safety switch in said circuit and an associated operating member therefor, said operating member being controlled by said winding handle releasing lever and means including said winding handle releasing lever and said safety switch operating member to close said safety switch concomitatly with the release of said winding handle.

3. In combination, a camera having a multiple aperture focal plane shutter curtain, unwinding and winding up rollers for said shutter curtain, a winding handle on said camera in operative relation with said unwinding and winding up rollers for winding up and cocking said shutter, a photoflash lamp controlling unit associated with said camera, a circular aperture in said unit through which said handle projects, a projecting member integral with said handle, a normally open contact set, contact controlling means including a pivotally mounted member engageable by said projecting member, a releasing lever for tripping said handle, means including said contact controlling means and said projecting member on the unwinding movement of said handle when tripped by said releasing lever for closing said contact set, a photoflash lamp, a battery and a normally open safety switch, a member for operating said safety switch and means including said handle releasing lever for operating said safety switch operating member to close said safety switch concomitantly with the tripping of said handle to cause the unwinding movement of said shutter curtain and the closing of said contact set whereby the circuit to said photoflash lamp is completed in timed relation to the movement of said shutter curtain.

4. In combination, a camera having a multiple aperture focal plane curtain shutter strip, unwinding and winding up rollers supporting said curtain shutter strip, a winding handle attached to said camera and in operable relation with said rollers, a photoflash unit attachable to said camera and contiguous to said handle, an apertured disk in said unit, said disk having a centrally positioned circular flanged opening through which said handle projects, a cam member pivoted in the flange of said disk, a projecting member portion on said handle in operative relation with said cam, said cam operably attached to electrical contacting means, the contacting of said electrical contacting means being made upon the unwinding movement of said handle through means including said cam member and said projecting member portion, said electrical contacting means included in a circuit, said circuit also including a flashlight and battery whereby the flashing of said flashlight is in synchronism with the tripping movement of the focal plane shutter operable with the unwinding movement of the handle aforesaid.

5. The structure as set forth in claim 4, and said apertured disk being rotatably adjustable, said rotatable movement of said disk causing either advance timing or retarding of said contacting means, a portion of said disk projecting below the casing of said synchronizing unit, the exposed portion of said disk having scaled division markings thereon, said markings indicating the position of said disk in the rotation thereof and indicating whether said contacting means is set for advanced or retarded timing with respect to the contacting of the contacts of the contacting means.

6. In combination, a camera having a multiple aperture focal plane curtain shutter strip, unwinding and winding up rollers supporting said curtain shutter strip, a winding handle attached to said camera and in operable relation with said unwinding and winding up rollers, a photoflash unit attachable to said camera and contiguous to said winding handle, a flanged apertured disk in said unit, said disk having a centrally positioned circular opening through which said handle projects, a cam member pivotally mounted in said flange and movable within the rim of said circular opening, a projecting member portion on said handle and engageable with said cam, said disk having electrical contacting means thereon, said disk operably attached to said cam, the contacting of said electrical contacting means being made upon the unwinding movement of said handle through the medium of contact engagement of said cam with said projecting member portion, said contacting means included in a circuit, said circuit also including a flashlamp and battery, said flashlamp and battery attachable to the camera aforesaid.

7. The structure as set forth in claim 6, said apertured disk being rotatably adjustable, said adjustment enabling the adjustment of the timing periods for the contacting of said contacting means to effect the synchronizing of the set-off of said focal plane shutter with the flashing of the flashlamp aforesaid.

8. The structure as set forth in claim 6, said apertured disk projecting below the casing of said synchronizing unit, the exposed portion thereof having visible markings thereon, said markings indicating the timing period of the contacting of said contact means, said disk being rotatably adjustable.

9. The structure as set forth in claim 6, and said apertured disk being rotatably adjustable, said rotatable movement of said disk causing advance timing or retarding of the contacting means, said disk adjustment adjustable in accordance with the release of said shutter strip, a portion of said disk projecting below the casing of said synchronizing unit, the exposed portion of said disk having scaled division markings thereon, said markings indicating the position of said disk and the setting thereof for timing the period at which said contacting of said contact means is to be made.

10. In combination, a camera having a multiple aperture focal plane curtain shutter strip, unwinding and winding up rollers supporting said curtain shutter strip, a winding handle attached to said camera and in operable relation with said rollers, a photoflash unit attachable to said camera and contiguous to said winding handle, a flanged apertured disk in said unit, said disk having a centrally positioned circular opening through which said handle projects, a cam member pivotally mounted in the flange of said disk and movable within the rim of said circular opening, a projecting member portion on said handle within the path of said cam on the rotation of said handle thereby causing said cam to pivotally move upon the unwinding set-off movement of said handle; contacting contact means integral to said cam, said pivotal movement of said cam causing the contacting of said contacting means, said contacting means included in a circuit, said circuit also including a flashlight and battery, said flashlight and battery attachable to the camera aforesaid.

MORRIS SCHWARTZ.
ERNEST SISTO.
WILLIAM CASTEDELLO.